United States Patent [19]

Dobras

[11] 4,115,703
[45] Sep. 19, 1978

[54] HAND HELD OPTICAL READING DEVICE

[75] Inventor: Bruce W. Dobras, Dayton, Ohio

[73] Assignee: Monarch Marking Systems, Inc., Dayton, Ohio

[21] Appl. No.: 739,525

[22] Filed: Nov. 8, 1976

[51] Int. Cl.² ............................................. G06K 7/10
[52] U.S. Cl. .................................. 250/568; 235/472; 340/146.3 SY
[58] Field of Search .............. 250/568; 340/146.3 SY; 325/357; 235/472

[56] References Cited

U.S. PATENT DOCUMENTS

| 2,362,034 | 11/1944 | Stahl | 325/357 X |
| 3,474,234 | 10/1969 | Rieger et al. | 235/61.11 E |
| 3,673,416 | 6/1972 | Berler | 235/61.11 E |
| 3,976,973 | 8/1976 | Martin et al. | 235/61.11 E |

Primary Examiner—Lawrence J. Dahl

Attorney, Agent, or Firm—Jacox & Meckstroth

[57] ABSTRACT

A molded housing is formed by two opposing mating sections and includes a forward head portion projecting from a handle portion. The housing sections confine therebetween a lens barrel and a light source which have corresponding inclined axes converging toward the bottom surface of a generally V-shaped tip member projecting downwardly from the forward end of the housing. The housing sections also confine therebetween a printed circuit board forming part of an electronic amplifier for a photosensing unit supported within the lens barrel. The lens barrel and light source cooperate with the tip member so that tilting of the housing within limits does not effect accurate reading of a code during scanning. The housing is lined with a layer of metal to shield the amplifier from external electrical interference, and the lens barrel casing may be molded as an integral part of the housing sections.

20 Claims, 6 Drawing Figures

U.S. Patent  Sept. 19, 1978  4,115,703
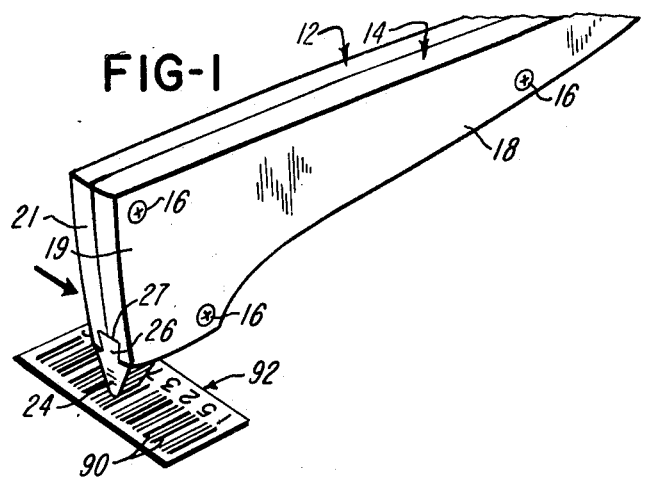
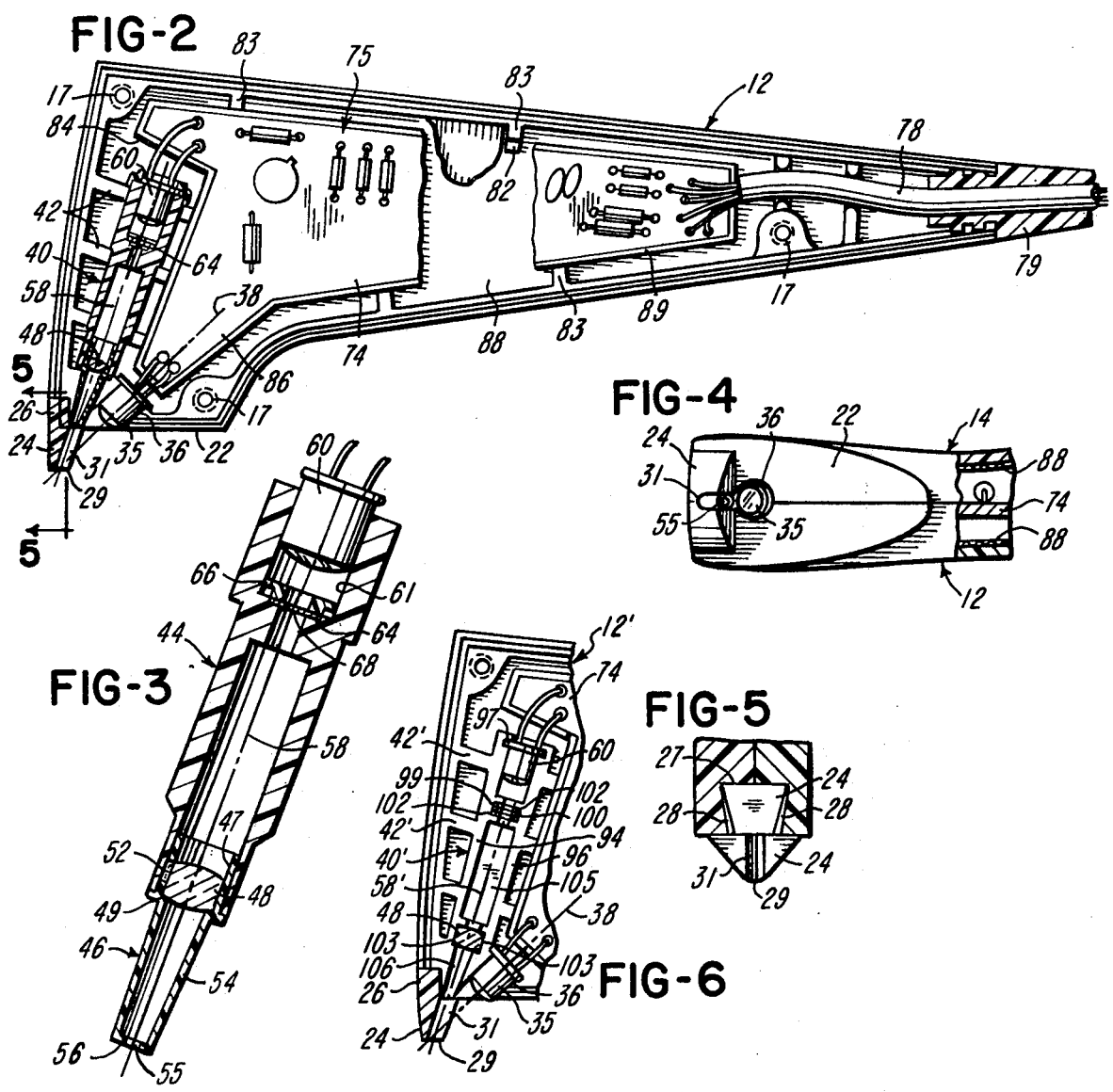

4,115,703

HAND HELD OPTICAL READING DEVICE

BACKGROUND OF THE INVENTION

The field of this invention involves hand held optical reading or scanning devices of the general type disclosed in U.S. Pat. No. 3,809,893 which issued to the assignee of the present invention. The optical reading device disclosed in this patent is of the form of an elongated generally cylindrical probe which is held like a pencil and incorporates optical fibers for transmitting reflected light to a photosensitive unit. Other similar optical reading devices are disclosed in U.S. Pat. Nos. 3,701,886 and 3,727,030. The prior art of hand held optical reading devices also includes devices which are adapted to be gripped in one hand, for example, such as the devices disclosed in U.S. Pat. Nos. 3,673,416, 3,685,723 and 3,947,817.

SUMMARY OF THE INVENTION

The present invention is directed to an improved hand held optical reading device which is of simplified and relative inexpensive construction and which can be efficiently assembled in production. The optical reading device of the invention is also constructed for convenient use and provides for flexibility in scanning movement without effecting the operation or accuracy of the device. The device further provides for a high reading resolution without electrical noise or interference.

In accordance with one embodiment of the invention, the above features and advantages are provided in an optical scanning device which generally includes a housing formed by two mating molded plastic housing sections. The sections include a handle portion which extends rearwardly from a head portion having a generally vertical forward end surface and a horizontal bottom surface. A V-shaped tip member projects downwardly from the forward end of the housing and defines a light shielding groove. A light source and a lens barrel are sandwiched or confined between the housing sections adjacent the tip member and have corresponding optical axes which are inclined relative to the forward end and bottom surfaces of the housing and which converge to a point at the bottom of the groove. The lens barrel also supports a photosensing unit which is connected to a solid state amplifying circuit formed on a printed circuit board also confined between the housing sections and shaped to extend adjacent the light unit and the photosensing unit. The housing sections are each lined with a copper layer which shields the amplifier from outside electrical interference and cooperates to provide for reading with high resolution. In a modification, the lens barrel casing is molded as an integral part of the housing sections.

Other features and advantages of the invention will be apparent from the following description, the accompanying drawing and the appended claims.

BRIEF DESCRIPTION OF THE DRAWING

FIG. 1 is a perspective view of an optical scanning device constructed in accordance with the invention and illustrating its use for reading a parallel bar-type code;

FIG. 2 is a somewhat enlarged view of the optical scanning device shown in FIG. 1 with one of the housing sections removed and with certain components shown in vertical section or broken away;

FIG. 3 is an enlarged axial section of the lens barrel assembly shown in FIG. 2;

FIG. 4 is a fragmentary bottom view of the head portion of the device shown in FIG. 1;

FIG. 5 is a fragmentary section taken generally on the line 5—5 of FIG. 2; and

FIG. 6 is a fragmentary view of a housing section constructed in accordance with a modification of the invention.

DESCRIPTION OF THE PREFERRED EMBODIMENT

The hand held optical reading device illustrated in FIG. 1 includes a housing formed by a pair of mating housing sections 12 and 14 which are molded of a rigid plastics material and are secured together by a set of screws 16 extending into corresponding threaded openings 17. The housing sections 12 and 14 form a handle portion 18 which is adapted to be gripped in one hand and which extends from a head portion 19. The head portion 19 has a generally vertical forward end surface 21 and a generally horizontal bottom surface 22 (FIGS. 2 and 4).

A generally V-shaped tip member 24 is also molded of a rigid plastics material and has a dovetail-shaped upper portion 26 which is confined within a correspondingly shaped recess 27 formed within the lower front corner of the head portion 19. The dovetail portion 26 of the tip member 24 has laterally projecting ribs 28 which are received within corresponding grooves formed within the sides of the recess 27 so that the tip member 24 is locked by the housing sections 12 and 14 against relative movement. The tip member 24 has a rounded bottom surface 29, and an inclined slot or groove 31 extends upwardly from the rounded bottom surface 29.

A light source 35 in the form of a light emitting diode having a cylindrical casing, is confined within a cylindrical bore or opening 36 defined by the mating housing sections 12 and 14, and the light source 35 has a light beam axis 38 which extends into the bottom of the groove 31 within the tip member 24. The housing sections 12 and 14 also confine a lens barrel 40 which is supported by opposing semicircular recesses formed within a series of parallel ribs 42 molded as an integral part of the housing sections.

As shown in FIG. 3, the lens barrel 40 includes an upper section 44 and a lower section 46 each of which is molded of a rigid black plastics material. The lower section 46 has a cylindrical coupling portion 47 which projects or telescopes into the lower end portion of the upper section 44. A lens 48 is confined with the coupling portion 47 and seats on an annular inner shoulder 49. Preferably, the lens 48 is secured in position by a small portion of adhesive or cement 52 which is placed within a radial opening formed within the coupling portion 47 of the lens barrel section 46. The lower section 46 of the lens barrel 40 also includes a tapered tubular wall 54 having a reduced circular aperture 55 defined by an inwardly projecting annular flange or shoulder 56.

As illustrated in FIG. 2, the lens barrel 40 has an optical axis 58 which extends through the groove 31 within the tip member 24 and intersects the axis 38 of the light source 35 at the bottom surface 29 of the tip member 24. A photosensing unit 60 in the form of a photodiode, has a cylindrical casing which is retained within a cylindrical bore 61 formed within the upper end portion of the lens barrel section 44, and a disc-like annular mask 64 is retained within a counterbore at the bottom of the bore 61 by a retaining ring 66. The retaining ring 66 is molded of a plastics material and is pressed into the bore 61 to secure the mask 64 so that its center circular aperture 68 is concentric with the axis 58 of the lens barrel 40.

The light emitting diode 35 and the photodiode 60 are connected by corresponding lead wires to a printed circuit (PC) board 74 which forms part of a solid state electronic amplifier 75 for amplifying the electrical signal received from the photodiode 60. The PC board 74 also carries the power supply for the light emitting diode 35, and the power is supplied to the circuitry and solid state components on the board 74 through a flexible electrical conductor cord 78. The cord 78 extends into the housing through a resilient cord coupler 79 which is bonded to the cord 78 and is clamped between the housing sections 12 and 14. The cord 78 also includes conductors which conduct the amplified signal from the photodiode 60 to the electronic analyzer (not shown) which decodes the amplified signal.

As shown in FIG. 2, the PC board 74 is seated within notches 82 formed within a series of opposing ribs 83 molded as an integral part of the housing sections 12 and 14 so that the printed circuit board 74 is sandwiched or clamped between the housing sections. The PC board 74 also has a notch 84 into which the lens barrel 40 extends and has a portion 86 which projects downwardly to the light source 35. The inner surfaces of the housing sections 12 and 14 are lined with an electrical shielding layer 88 which may be in the form of a copper foil. The layer 88 may also be formed by a copper layer which is vacuum metalized or plated or sprayed onto the inner surfaces of the housing sections 12 and 14. This layer 88 is connected to a peripherally extending ground conductor 89 on the PC board along with the ground conductor within the cord 78.

The optical reading device of the invention is used by grasping the handle portion 18 in one hand and then passing the bottom surface 29 of the tip member 24 across a predetermined code such as a parallel bar code 90 preprinted on a label 92. As the bar code 90 is scanned by the tip member 24, the light from the light source 35 is interrupted by the bar code causing light pulses to be reflected into the lens barrel 40 and along the axis 58 into the photosensing unit 60. The pulsating reflected light causes the photosensing unit 60 to produce corresponding pulsating electrical signals which are amplified by the circuit 75 and transmitted through the cord 78 to the electronic circuit which decodes the amplified signals for producing a digital read out.

In accordance with a modification of an optical reading device constructed in accordance with the invention, a lens barrel 40' (FIG. 6) is formed in two mating opposing half sections which interfit together. Each section of the lens barrel 40' is molded as an integral part of the corresponding housing section, such as the housing section 12' shown in FIG. 6. Each lens barrel section includes generally parallel spaced walls 94 and 96 which have opposing cavities or grooves 97 for receiving the flange portion of the metal case of the photosensing unit 60. The walls 94 and 96 are integrally connected to the ribs 42' and also define opposing cavities or grooves 99 which receive an annular aperture mask 100 confined between a pair of annular discs or washers 102. Similarly, the lens 48 is confined within opposing cavities or grooves 103 formed within the walls 94 and 96 of each half section of the lens barrel 40'. The center optical axis 58' of the lens barrel 40' extends through the center of the chambers 105 and 106 and, as mentioned above, through the groove 55 within the tip member 24. The chambers 105 and 106 are rectangular in cross-section instead of being circular as are the corresponding chambers of the lens barrel 40 described above in connection with FIGS. 2 and 3.

From the drawing and the above description, it is apparent that a hand held optical reading device constructed in accordance with the present invention, provides desirable features and advantages. For example, the device is not only simple and economical in construction but also eliminates the need for optical fibers which are commonly used in many types of hand held optical reading devices. Furthermore, by extending the optical axis 58 of the lens barrel 40 or 40' through the groove 31 within the tip member 24, only light of uniform intensity from the light source 35 is reflected into the lens barrel and into the photosensing unit 60, and surrounding environmental light is shielded.

The location of the tip member 24 as an extension of the forward end surface 21 of the housing, also permits the operator to align quickly the end surface 21 with the middle of the bar code 90 as the code is scanned by the tip member. That is, the arrangement of the light source 35 and the lens barrel 40 with their axes converging at a point adjacent the flush forward end surfaces of the housing and tip member 24, permits the device to be quickly orientated relative to a bar code to be scanned and thereby assures that the entire code is read.

As another feature, the confinement of the light source 35, the lens barrel 40 and the PC board 74 between the housing sections 12 and 14, provides for quick assembly of these components within the housing and also permits the internal components to be easily preassembled as a sub-assembly. The V-shaped configuration of the tip member 24 further permits tilting of the device to either side while a code is being scanned and without effecting the accuracy of the reading. The handle portion 18 of the device may also be tilted upwardly or downwardly while scanning without effecting the reading accuracy.

The construction of the lens barrel 40 further provides for a simplified assembly of the lens 48, mask 64 and photosensing unit 60, while also providing for easily molding the undercut tapered wall 54 for the reduced light receiving aperture 55. This wall configuration relative to the aperture 55 has been found desirable to prevent light from being reflected from the inner surface of the lower section 46 of the lens barrel 40 into the photosensing unit 60, and thus provides for high reading resolution. Furthermore, by molding the opposing sections of the lens barrel 40' as integral parts of the housing sections 12 and 14, as shown in FIG. 6, the lens 48, photosensing unit 60 and aperture mask 100 may be easily and quickly assembled directly into the housing sections without having a separate sub-assembly of the lens barrel.

While the forms of the optical reading devices herein described constitute preferred embodiments of the invention, it is to be understood that the invention is not limited to these precise forms of devices, and that changes may be made therein without departing from the scope and spirit of the invention as defined in the appended claims.

The invention having thus been described, the following is claimed:

1. A hand held optical reading device comprising a housing including a head portion extending from a handle portion adapted to be held in one hand, said head portion of said housing having a forward end surface, a tip member projecting downwardly from said head portion and having a bottom surface adapted to be passed across a predetermined code carried by an article, said tip member having a forward end surface generally coplanar with said forward end surface of said head portion of said housing, a light source supported within said head portion of said housing and positioned to project a light beam onto the code adjacent said bottom surface of said tip member, a lens supported within said head portion of said housing having an optical axis, a photosensing unit disposed on said optical axis of said lens and adapted to generate electrical signals corresponding to light interruptions reflected through said lens when passing said tip member across the code, said optical axis of said lens substantially intersecting said bottom surface of said tip member and being inclined relative to said forward end surfaces of said head portion and said tip member, and electronic amplifier means enclosed within said housing and connected to amplify the signals generated by said photosensing unit.

2. An optical reading device as defined in claim 1 wherein said light source has an axis also inclined relative to forward end surface of said head portion and substantially intersecting said axis of said lens at said bottom surface of said tip member.

3. An optical reading device as defined in claim 1 wherein said lens is disposed forwardly of said light source, and said light source is disposed substantially adjacent said tip member.

4. A hand held optical reading device comprising a housing including a head portion extending from a handle portion adapted to be held in one hand, said head portion of said housing having a forward end surface, a tip member projecting downwardly from said head portion and having a bottom surface adapted to be passed across a predetermined code carried by an article, said tip member defining a light shielding rearwardly facing groove extending upwardly from said bottom surface of said tip member, a light source supported within said head portion of said housing and positioned to project a light beam onto the code adjacent said bottom surface of said tip member, a lens supported within said head portion of said housing and having an optical axis extending through said groove, a photosensing unit disposed within said housing and effective to generate electrical signals corresponding to light interruptions reflected through said lens when passing said tip member across the code, said optical axis of said lens substantially intersecting said bottom surface of said tip member, and electronic amplifier means enclosed within said housing and connected to amplify the signals generated by said photosensing unit.

5. A hand held optical reading device comprising a housing including two opposing mating housing sections, said housing having a head portion extending from a handle portion adapted to be held in one held, a tip member projecting downwardly from said head portion and having a bottom surface adapted to be passed across a predetermined code carried by an article, a light source supported within said head portion of said housing and positioned to project a light beam onto the code adjacent said bottom surface of said tip member, a lens supported within said head portion of said housing and having an optical axis, a photosensing unit positioned within said housing and effective to generate electrical signals corresponding to light interruptions reflected through said lens when passing said tip member across the code, means including opposing surfaces within said opposing housing sections for locating and supporting said lens and said light source in predetermined angular relation, said optical axis of said lens substantially intersecting said bottom surface of said tip member, and electronic amplifier means enclosed within said housing and connected to amplify the signals generated by said photosensing unit.

6. An optical reading device as defined in claim 5 wherein said electronic amplifier includes a circuit board confined between said housing sections, and each said housing section having an inner surface lined with a metal layer for shielding said amplifier.

7. An optical reading device as defined in claim 6 wherein said circuit board is aligned substantially with said optical axis of said lens.

8. A hand held optical reading device comprising a housing including a head portion extending from a handle portion adapted to be held in one hand, a tip member projecting downwardly from said head portion and having a bottom surface adapted to be passed across a predetermined code carried by an article, a light source supported within said head portion of said housing and positioned to project a light beam onto the code adjacent said bottom surface of said tip member, a lens supported within said head portion of said housing by a lens barrel and having an optical axis, said lens barrel having an upper tubular section and a lower tubular section including interfitting portions, means retaining said lens within said interfitting portions of said lens barrel sections, a photosensing unit disposed within said housing and adapted to generate electrical signals corresponding to light interruptions reflected through said lens when passing said tip member across the code, said optical axis of said lens substantially intersecting said bottom surface of said tip member, and electronic amplifier means enclosed within said housing and connected to amplify the signals generated by said photosensing unit.

9. A hand held optical reading device comprising a housing including two opposing and mating housing sections, said housing sections having a head portion extending from a handle portion adapted to be held in one hand, said head portion of said housing having a forward end surface, a tip member projecting downwardly from said head portion and having a bottom surface adapted to be passed across a predetermined code carried by an article, said tip member including an upper portion clamped between and supported by said housing sections, a light source supported within said head portion of said housing and positioned to project a light beam onto the code adjacent said bottom surface of said tip member, a lens supported within said head portion of said housing and having an optical axis, a photosensing unit disposed within said housing and effective to generate electrical signals corresponding to light interruptions reflected through said lens when passing said tip member across the code, said optical axis of said lens substantially intersecting said bottom surface of said tip member, and electronic amplifier means enclosed within said housing and connected to amplify the signals generated by said photosensing unit.

10. A hand held optical reading device comprising a housing including a head portion extending from a handle portion adapted to be held in one hand, said head portion of said housing having a forward end surface, a tip member projecting downwardly from said forward end surface of said head portion and having a bottom surface adapted to be passed across a predetermined code carried by an article, a light source supported within said head portion of said housing and positioned to project a light beam generally along an axis onto the code adjacent said bottom surface of said tip member, a lens supported within said head portion of said housing and having an optical axis, a photosensing unit disposed on said optical axis and adapted to generate electrical signals corresponding to light interruptions reflected through said lens when passing said tip member across the code, said optical axis of said lens converging with and substantially intersecting said axis of said light beam adjacent said bottom surface of said tip member, and said axis of said lens and said axis of said light beam are both inclined relative to said forward end surface of said head portion.

11. An optical reading device as defined in claim 10 wherein said tip member has generally a V-shaped configuration and defines a rearwardly facing light shielding groove extending from said housing to said bottom surface of said tip member, and said axis of said lens extends through said groove.

12. A hand held optical reading device comprising a pair of opposing housing sections forming a housing having a head portion extending from a handle portion adapted to be held in one hand, means for securing said housing sections together, a light source supported between said housing sections within said head portion of said housing and positioned to project a light beam onto a code carried by an article, a lens also supported between said housing sections within said head portion of said housing and having an optical axis converging with the light beam, a photosensing unit supported by and between said housing section and disposed on said optical axis for generating electrical signals corresponding to light interruptions reflected through said lens when passing said light beam across the code, electronic amplifier means connected to amplify the signals generated by said photosensing unit, and said amplifier means supported between said housing sections.

13. An optical reading device as defined in claim 12 and including a tip member projecting downwardly from said head portion of said housing and having a bottom surface, and said axis of said lens substantially intersects an axis of said light source adjacent said bottom surface of said tip member.

14. An optical reading device as defined in claim 13 wherein said tip member has generally a V-shaped configuration and defines a light shielding groove extending upwardly from said bottom surface of said tip member, and said axis of said lens extends through said groove.

15. An optical reading device as defined in claim 12 wherein said lens is confined between opposing lens barrel sections formed as integral parts of said corresponding housing sections.

16. A hand held optical reading device comprising a pair of mating housing sections forming a housing having a head portion extending from a handle portion adapted to be held in one hand, said head portion of said housing having a forward end surface, a tip member projecting downwardly from said head portion and having a bottom surface adapted to be passed across a predetermined code carried by an article, a light source supported by and between said housing sections within said head portion of said housing and positioned to project a light beam onto the code adjacent said bottom surface of said tip member, a lens supported by and between said housing sections forwardly of said light source and having an optical axis converging with said forward end surface of said housing, a photosensing unit supported by and between said housing sections and positioned to generate electrical signals corresponding to light interruptions reflected through said lens when passing said tip member across the code, electronic amplifier means enclosed within said housing and connected to amplify the signals generated by said photosensing unit, and said amplifier means including a circuit board supported by and between said housing sections and extending rearwardly of said light source and said lens within said handle portion.

17. An optical reading device as defined in claim 16 wherein said axis of said lens and an axis of said light source are each inclined relatively to said forward end surface of said head portion of said housing.

18. A hand held optical reading device comprising a set of opposing molded plastic housing sections forming a housing having a head portion extending from a handle portion adapted to be held in one hand, said head portion of said housing adapted to be passed across a predetermined code carried by an article, a light source supported by and between said housing sections and positioned to project a light beam onto the code, lens means supported by and between said housing sections and having an optical axis, photosensing means supported by and between said housing sections and positioned to generate electrical signals corresponding to light interruptions reflected to said photosensing means when passing said head portion across the code, electronic amplifier means supported by and between said housing sections and connected to amplify the signals generated by said photosensing unit, and each said housing section having an inner surface lined with a metal layer for shielding said amplifier means.

19. A hand held optical reading device comprising a set of opposing housing sections forming a housing having a head portion extending from a handle portion adapted to be held in one hand, means for securing said housing sections together, a light source confined between and supported by said housing sections within opposing cavities in said head portion of said housing and positioned to project a light beam onto a code carried by an article, a lens confined between and supported by said housing sections within opposing cavities in said head portion of said housing and having an optical axis, a photosensing unit confined between and supported by said housing sections within opposing cavities and adapted to generate electrical signals corresponding to light interruptions reflected through said lens when passing said light beam across the code, electronic amplifier means connected to amplify the signals generated by said photosensing unit, and said amplifier means including a circuit board confined between and supported by said housing sections.

20. An optical reading device as defined in claim 19 and including a tip member projecting downwardly from said head portion of said housing and having a bottom surface, and said axis of said lens substantially intersects an axis of said light source adjacent said bottom surface of said tip member.

* * * * *